April 21, 1942.　　　　V. HARTLEY　　　　2,280,581
LIGHT-SCREENING DEVICE FOR LAMPS
Filed Oct. 12, 1940　　　　3 Sheets-Sheet 1

Inventor:
Vincent Hartley
By his Attorney Walter Gunn

April 21, 1942.   V. HARTLEY   2,280,581
LIGHT-SCREENING DEVICE FOR LAMPS
Filed Oct. 12, 1940   3 Sheets-Sheet 2

Inventor:
Vincent Hartley
By his Attorney: Walter Gunn

April 21, 1942.　　　　V. HARTLEY　　　　2,280,581
LIGHT-SCREENING DEVICE FOR LAMPS
Filed Oct. 12, 1940　　　3 Sheets-Sheet 3

Inventor:
Vincent Hartley
By his Attorney Walter Lunn

Patented Apr. 21, 1942

2,280,581

UNITED STATES PATENT OFFICE 2,280,581

LIGHT-SCREENING DEVICE FOR LAMPS

Vincent Hartley, Greenfield, England

Application October 12, 1940, Serial No. 360,873
In Great Britain October 6, 1939

6 Claims. (Cl. 240—48.4)

This invention relates to light-screening devices having as their object the controlling of the direction of light rays from a light source such as an electric lamp. The more immediate application of the invention is to the head lamps of motor road vehicles, either as a safety device or mask during light-restriction conditions (e. g. in wartime) or merely as an anti-dazzle device at any time; but the invention is equally applicable to other uses where a non-dazzle beam of light of a controlled cross-section is required, to give adequate vision to persons behind the device whilst the actual light source is largely concealed from the vision of persons in front of the device. Instances, among many, where the invention may find a use other than on road vehicles are, in street lighting, in ship's lighting and in the interior lighting of buildings.

The invention is of a nature such that where light from an aperture is to be excluded from a particular zone (for example from above a horizontal plane), it is caused to pass between spaced louvres, plates or baffles (hereinafter referred to generically as louvres) immediately adjacent the aperture, so arranged that between any two consecutive louvres a plane at the greatest angle without cutting them does not enter the prohibited zone when extended forwardly from the aperture, and so treated as to be non-reflective towards that zone.

To some extent the arrangement of louvres may vary as regards their positional relationship with the light source. For example, they may surround the light source, as in certain instances of street lighting, so as to give control in all directions; or they may have a uni-directional disposition, as in the case of a motor vehicle head-lamp; or again they may have any relationship intermediate of those extremes, for example on two or three sides of a light source.

Usually, there will be a translucent screen over the aperture behind the louvres, either between it and the louvres, or, which is preferred, on the side furthest from the louvres, which screen may comprise frosted glass, or, according to a further feature of the invention, may consist of an acid-etched glass. The frosting or etching will preferably be over the whole surface of the screen, but may, as an alternative, be over some parts only, say for instance in parallel stripes.

In the accompanying drawings illustrations of the invention will be found:

Figure 3:
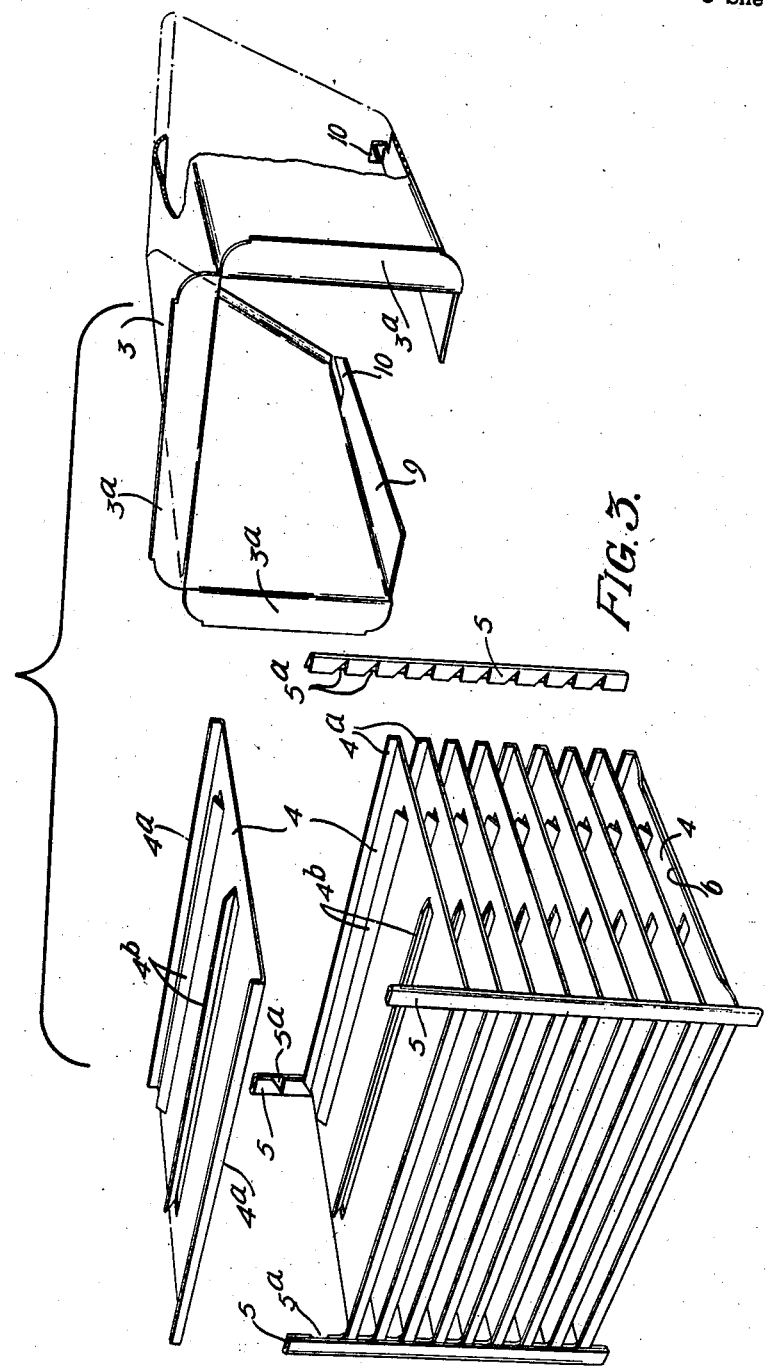
Fig. 3 is an exploded view of the device, omitting the opaque disc and the translucent screen.

Referring to the drawings, the device in the form shown, comprises a supporting member 1 in the shape of an opaque circular disc with flanged rim 2, this disc being dimensioned so as to fit in and be held by the bezel of a standard motor vehicle head-lamp, in place of the usual front glass. Secured to the front face of the member 1 is an open-bottomed hood or shroud 3, longer at the top than at the bottom, and open at the front, the front upper and side corners being curved inwardly to a small radius. The hood 3 is secured to the disc by means of its flanges 3a being spot-welded to such disc. Secured within this hood or shroud is the assembly of spaced louvres, the louvres being identical in size and shape, and each one comprising a rectangular metal plate 4 flanged along its longer edges 4a and having two upwardly-pressed, oppositely-inclined lips or tongues 4b parallel to such edges (see Fig. 3). These louvres are secured together as an assembly, and at the desired intervals, by means of the U-sectioned metal strips 5, one web of each strip 5 being cut-away at spaced points 5a, to provide supports for the louvres 4. The end parts of the flanges 4a enter between the webs of the parts 5 and, after their insertion, the serrated web is pressed down on to those flanges to grip them, and is afterwards further secured by soldering, galvanizing or the like. In the finished assembly the ends of the lowermost louvre 4 are bent upwards as at 6 in Fig. 3, to give further rigidity to the assembly. The ends of the U-sectioned strips 5 project above and below the louvres, as seen in Fig. 3.

Figure 5:
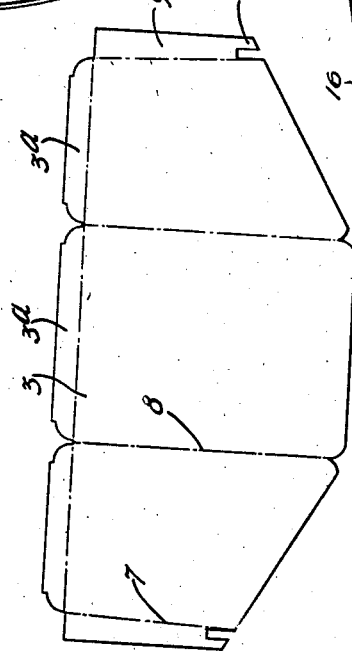
Fig. 5 is a plan of a blank formed for making the hood or shroud.

From Fig. 5 it will be seen that the outer transverse fold lines of the blank for the hood 3 are not parallel with the inner transverse fold lines 8. The result is that when folding has occurred the lower corners of the hood and the inturned bottom flanges, are inclined downwardly and forwardly with respect to the top corners, see Fig. 1. The assembly of louvres is inserted into the hood and rests upon the inturned flanges 9 at the bottom of the hood, so that the louvres themselves, being in parallel relationship with those flanges, are also inclined downwardly and forwardly. The forward ends of the inturned flanges 9, which have been notched to form tongues 10, have those tongues turned up over the lowermost louvre when the louvres are in position, to hold the assembly within the hood.

In order properly to locate the hood on the supporting disc 1, an angle member 3a is spotwelded to the disc, below the light aperture, and against this member the lowermost louvre abuts, see Fig. 1.

Figure 4:
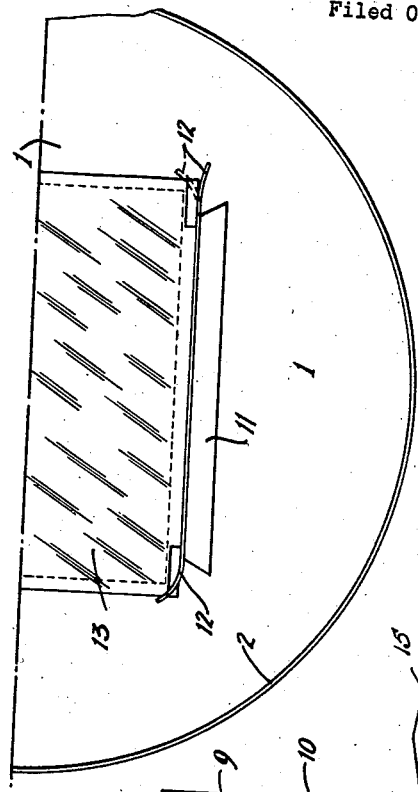
Fig. 4 is a rear view of one half of the device shown in Figs. 1 and 2.

Spot-welded to the rear face of the opaque member 1, are two parallel angle-strips 11, each having free triangular extremities 12. A frosted glass or acid-etched or other translucent screen 13 is placed between these strips so as to cover the light aperture behind the louvres, and such screen is retained in position by the triangular extremities 12 being bent upwardly and downwardly respectively to overlie and bind against the glass, see Fig. 4.

During the making-up of the device, the assembly of louvres, and the inner surface of the hood is sprayed with a black pigment to give all the parts a matt black surface so as to be as non-reflective as possible.

Figure 2:
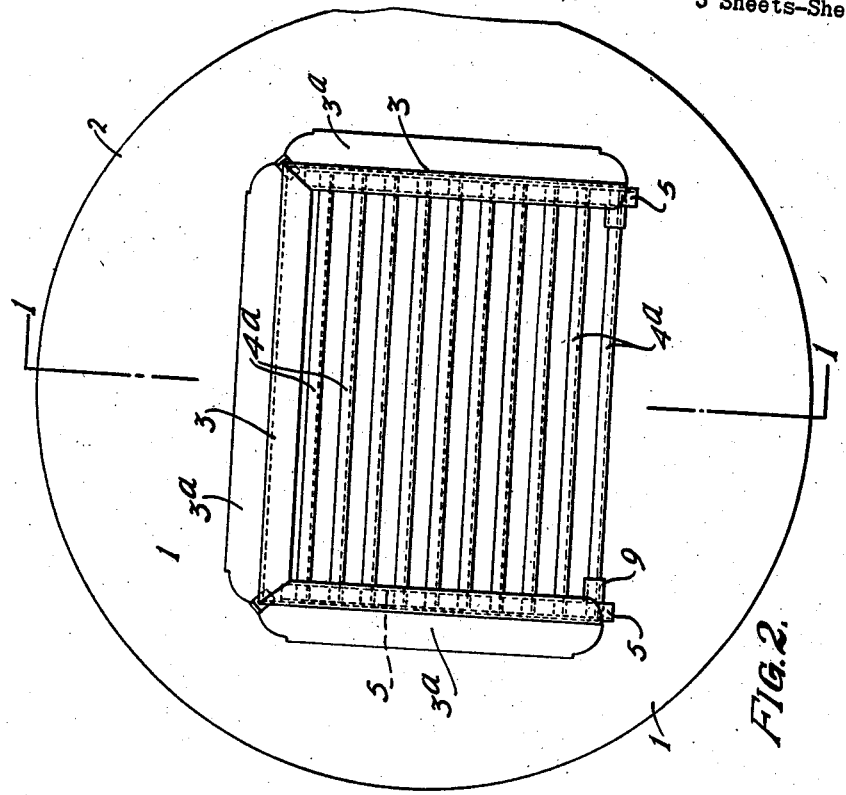
Fig. 2 is a front view of the same, but with the interior parts—that is the parts behind the front extremities of the louvres—omitted.
Figure 1:
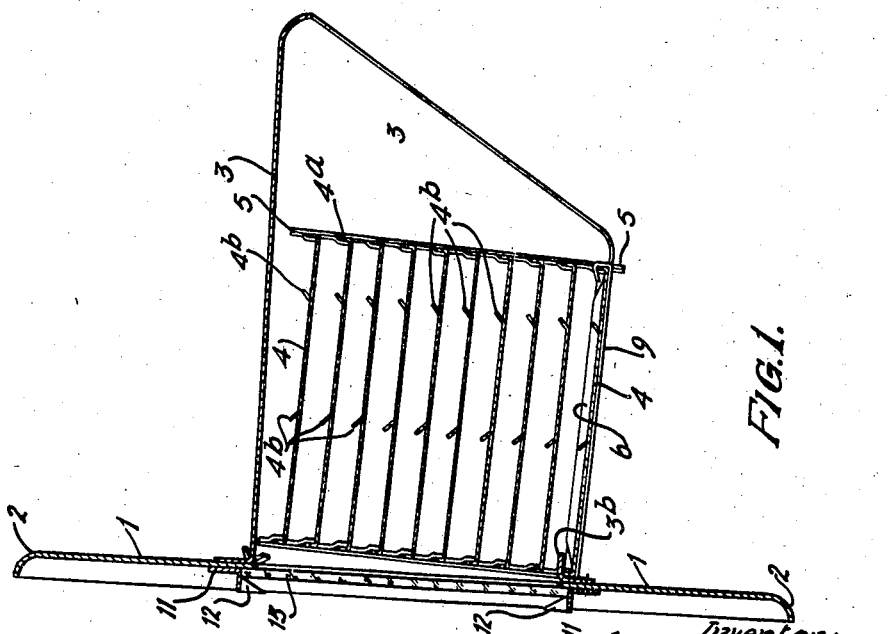
Fig. 1 is a longitudinal section through one form of light-screening device according to this invention, as adapted for a motor vehicle head-lamp.

A consideration of Fig. 1 will show further that the upstanding lips 4b will obstruct light passing between the louvres and will prevent many rays of light striking the upper surface of the louvres, and thereby will prevent reflection into the prohibited zone. The number of louvres, and their distance apart will vary according to the intensity of light to be emitted and to the purposes for which the light is required. A sheet of clear glass may be secured immediately in front of the louvres to exclude dust etc.

Figure 6:
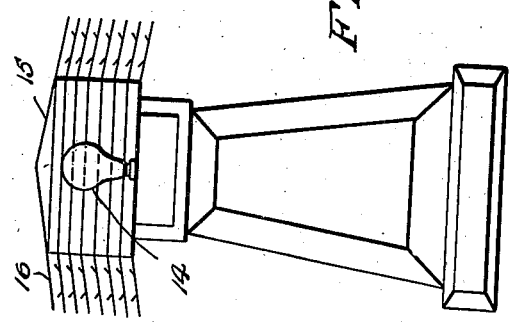
Figs. 6 and 7 are part-sectional elevation and plan respectively of one form of street lighting having the invention incorporated therein.
Figure 7:
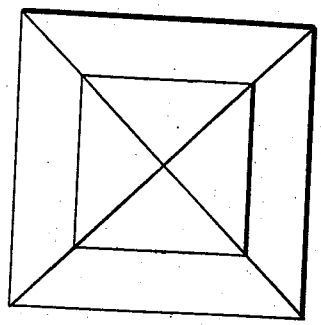

Figs. 6 and 7 illustrate a street bollard with a lighting device according to this invention. The lamp 14 is housed in a casing 15 surrounded by the louvres 16, the louvres being disposed so that no direct light may pass between them at an angle above the horizontal, and being so treated that no light will be reflected off their upper surfaces.

The whole device will usually be made of metal, either as a built-up assembly of stampings and pressings (as shown) or as a casting, or with parts cast and parts fabricated. Alternatively some of the parts may be of other than metal: for instance the opaque shield may be of thick card, waterproofed, or of wood.

What I claim is:

1. A light-screening device comprising a series of rectangular plates of identical form flanged on their transverse parallel edges, spacing means comprising U-section strips gripping the plates at their corners to hold them in parallel spaced relation with each other as a single united assembly, tongues pressed up from the plates parallel with the flanged edges to cast shadows on the top surfaces of the plates, a hood enclosing the assembly of plates on three sides, the hood extending forwardly at one end beyond the plates, and an apertured disc carrying the hood and the assembly of plates immediately in front of the aperture, the plates being disposed so that a plane at the greatest angle between but not cutting any consecutive two of them will not extend above the highest part of the aperture.

2. In combination with the bezel of a headlamp, a light-screening unit including an apertured blank fitted onto said lamp to shut off light except at said aperture, a series of parallel, flat, spaced plates having non-reflective faces fixed to said blank and extending outwardly from said lamp, said plates being mounted at an angle to the face of said blank other than a right angle so that said plates are tilted slightly downward from said lamp, a series of shadow-casting ribs punched from said plates extending transversely of the direction of light rays from said lamp, the length of said plates, the angle thereof to said blank and the spacing between plates being such that light passing directly from said lamp between each pair of plates will not extend to a level higher than the top of said aperture, a plurality of supports having notches for said plates and crimped thereon to form a unitary plate assembly.

3. In combination with the bezel of a headlamp, a light-screening unit including an apertured blank fitted onto said lamp to shut off light except at said aperture, a series of parallel, flat, spaced plates having non-reflective faces joined together as a unit, said unit being fixed to said blank and extending outwardly from said lamp, said plates being mounted at an angle to the face of said blank other than a right angle so that said plates are tilted slightly downwrd from said lamp, a hood extending over said plates and secured to said blank, the free end of said hood extending substantially beyond said plates a sufficient distance to screen from above light diffused from the front of said plates, said hood having depending screen sides, the lower edges thereof being inturned to form flanges, said plates resting on said edges and secured thereto.

4. In combination with the bezel of a headlamp, a light-screening unit including an apertured blank fitted onto said lamp to shut off light except at said aperture, a series of parallel, flat, spaced plates having non-reflective faces joined together as a unit, said unit being fixed to said blank and extending outwardly from said lamp, said plates being mounted at an angle to the face of said blank other than a right angle so that said plates are tilted slightly downward from said lamp, a hood extending over said plates and secured to said blank, the free end of said hood extending substantially beyond said plates a sufficient distance to screen from above light diffused from the front of said plates, said hood having depending screen sides so as to cover the sides of said plates substantially completely, the lower edges thereof being inturned to form flanges, said plates resting on said edges and secured thereto, said edges being at the same angle to said blank as said plates.

5. In combination with the bezel of a headlamp, a light-screening unit including an apertured blank fitted onto said lamp to shut off light except at said aperture, a translucent substantially flat screen fixed in said aperture to diffuse light from said lamp, a series of parallel, flat, spaced plates having non-reflective faces joined together as a unit, said unit being fixed to said blank and extending outwardly from said lamp, said plates being mounted at an angle to the face of said blank other than a right angle so that said plates are tilted slightly downward from said lamp, a hood extending over said plates and secured to said blank, the free end of said hood extending substantially beyond said plates a sufficient distance to screen from above light diffused from the front of said plates, said screen being secured to the side of said blank facing said lamp, said hood having depending screen sides the lower edges of which being inturned, said plates resting on said inturned edges.

6. In combination with the bezel of a headlamp, a light-screening unit including an apertured blank fitted onto said lamp to shut off light except at said aperture, a series of parallel, flat, spaced plates having non-reflective faces fixed to said blank and extending outwardly downwardly from said lamp, said plates being substantially rectangular and of the same size, being joined together at both front and back to form a unit, and a hood extending over said unit and beyond the same a sufficient distance to screen from above light diffused from the front of said plates, said hood being secured to said blank, and provided with inturned flanges upon which said plates rest.

VINCENT HARTLEY.